United States Patent
Reutlinger et al.

(10) Patent No.: US 6,863,295 B2
(45) Date of Patent: Mar. 8, 2005

(54) ELECTRICALLY CONTROLLABLE TRAILER COUPLING

(75) Inventors: Peter Reutlinger, Bretten (DE); Andreas Piede, Illingen (DE); Eberhard Palmer, Vaihingen (DE)

(73) Assignee: Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/615,455

(22) Filed: Jul. 9, 2003

(65) Prior Publication Data

US 2004/0075243 A1 Apr. 22, 2004

(30) Foreign Application Priority Data

Jul. 11, 2002 (DE) .......................................... 102 31 222

(51) Int. Cl.[7] .................................................. B60D 1/54
(52) U.S. Cl. ..................................... 280/491.3; 280/432
(58) Field of Search ............................. 280/477, 478.1, 280/479.1, 479.2, 479.3, 491.1, 491.2, 491.3, 491.4

(56) References Cited

U.S. PATENT DOCUMENTS

| | | | | |
|---|---|---|---|---|
| 6,000,709 A | * | 12/1999 | Gentner et al. | .......... 280/479.1 |
| 6,234,511 B1 | * | 5/2001 | Gentner et al. | .......... 280/479.1 |
| 2003/0075900 A1 | * | 4/2003 | Kleb et al. | ................ 280/491.3 |
| 2003/0137126 A1 | * | 7/2003 | Reuter et al. | ............. 280/479.1 |

FOREIGN PATENT DOCUMENTS

| | | |
|---|---|---|
| EP | 0 388 848 A2 | 9/1990 |
| EP | 0832000 | 2/2000 |
| EP | 1 084 872 A2 | 3/2001 |

* cited by examiner

Primary Examiner—Kevin Hurley
(74) Attorney, Agent, or Firm—Crowell & Moring LLP

(57) ABSTRACT

A trailer coupling for motor vehicles able to be moved from a working position to a resting position and the reverse. To increase safety, a motion of the trailer coupling is allowed only if the velocity of the motor vehicle is <=5 Km/h, if the rear window or tailgate is open and if no trailer is fastened on the coupling. The motion is stopped if the torque of the drive motor exceeds a specifiable reference value.

12 Claims, 1 Drawing Sheet

ELECTRICALLY CONTROLLABLE TRAILER COUPLING

BACKGROUND AND SUMMARY OF THE INVENTION

This application claims the priority of Application No. 102 312 22.2, filed Jul. 11, 2002, in Germany, the disclosure of which is expressly incorporated by reference herein.

The invention concerns a trailer coupling for motor vehicles with a coupling ball. The known trailer coupling also includes a drive motor by means of which the ball neck is reversibly movable with the coupling ball from a working position into a resting position. Such an arrangement is already known, for example, from EP 0 832 000 B1. With this arrangement, the control unit for the drive for moving the ball neck is blocked when the motor of the motor vehicle is running. Sensors, for example in the form of end position switches, are provided to record the working and resting position of the trailer coupling in any given case. A control unit ensures that either moving of the ball neck or travel of the motor vehicle is permitted. The control unit blocks the drive for the motion of the ball neck when the motor of the motor vehicle is running.

The object of the present invention is a further improvement of safety during activation of the trailer coupling.

This objective of the invention is accomplished with the characterizing features of the present invention whereby when one a plurality of predetermined conditions exist, the activation of the motion of the trailer pulling device is prevented.

It is especially advantageous that these different conditions are OR-linked. In this way, it is assured that in each case in which one of the defined conditions is not met, a motion of the trailer pulling device does not occur, resulting in the fact that once again the safety for bystanders is further increased.

Recording the rate of travel as one of these conditions has the advantage that two motions, the motion of the motor vehicle and the motion of the trailer pulling device, do not take place simultaneously, and the driver of the motor vehicle as well as well as bystanders do not need to pay attention to two processes at once. Moreover, the velocity v in the vehicle is already known for additional processes to be controlled, such as motor control, and needs only be read out by the control apparatus for activating the motion of the trailer-pulling device.

A verification of whether the trailer is coupled to the motor vehicle is simply possible in that the socket to the electrical connection of the trailer is monitored with a corresponding sensor able to recognize a trailer. A purely electronic recording is possible in which the direction of a travel indicator is briefly subjected to current in the shut off state and recognized through the rising voltage level of the trailer. It is guaranteed through such an evaluation that the trailer-pulling device is not actuated if a trailer is connected.

Checking whether the rear window or the tailgate is open is a condition that advantageously ensures that a person is situated in the direct swivel range of the trailer coupling.

In the final analysis, it is advantageous to monitor the motion of the trailer pulling device itself since this offers the possibility of stopping the motion of the trailer pulling device and/or reversing the direction of motion in the event resistance occurs, for example because a child has moved into the motion space of the trailer pulling device.

Other objects, advantages and novel features of the present invention will become apparent from the following detailed description of the invention when considered in conjunction with the accompanying drawings.

DETAILED DESCRIPTION OF THE DRAWINGS

Figure 1:
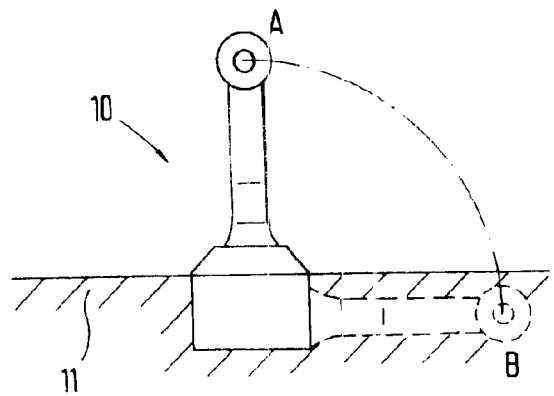
FIG. 1 shows the basic structure of a swiveling trailer coupling.

FIG. 1 shows the basic structure of a swiveling trailer coupling. Here a trail coupling 10, which is installed on the rear 11 of a motor vehicle, is represented in a working position A and a resting position B. The dotted line between the two possible end positions of the trailer coupling 10 characterizes the radius of motion of the trailer coupling. In this figure, a lateral swiveling of the trailer coupling is represented, whereby nonetheless swiveling motions downward or even oblique swiveling motions are also known and possible. For the sake of clarity, the likewise usual socket for the electrical connection of a trailer with the pulling vehicle is not represented here.

Figure 2:
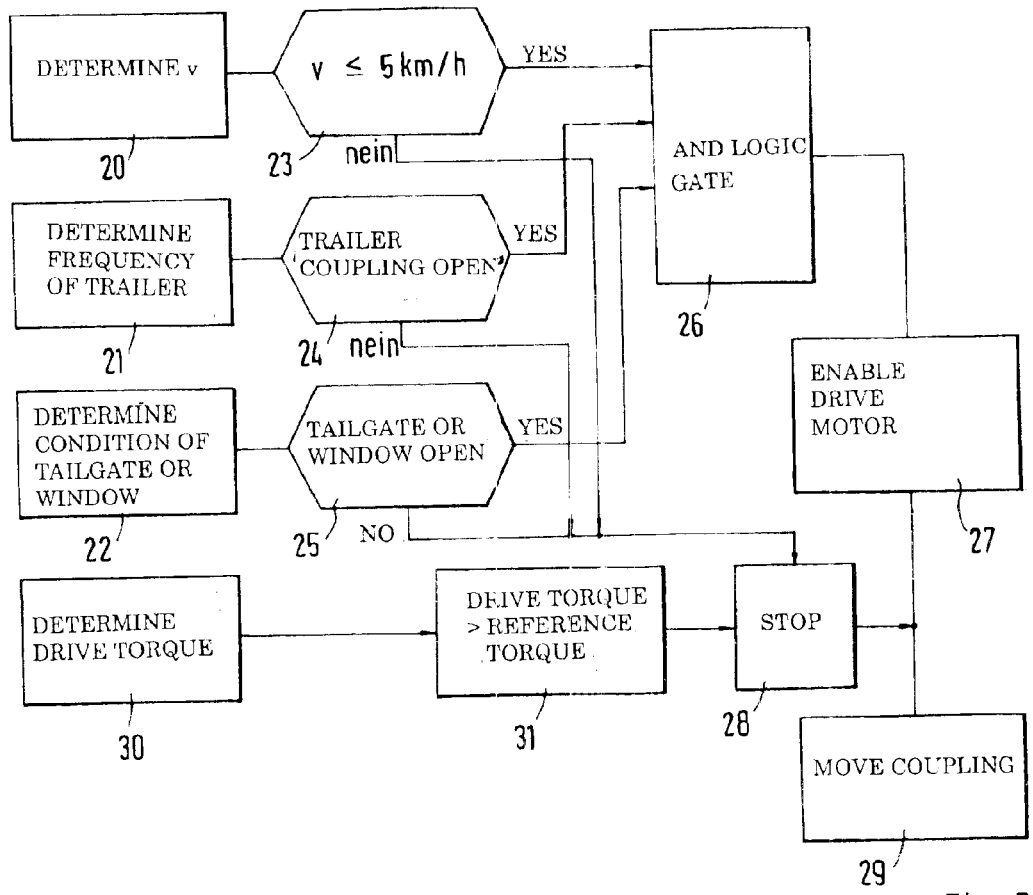
FIG. 2 illustrates the control logic circuits in schematic overview.

FIG. 2 shows in schematic representation what dimensions and conditions are recorded and how these are evaluated in order to improve the safety of the activation of the trailer coupling.

First of all various dimensions are recorded in initial steps 20, 21 and 22. Hence in step 20, the velocity v of the motor vehicle is ascertained, and it is checked in a subsequent query 23 whether the velocity v exceeds a pre-set value, which is defined here as 5 km/h. Since the velocity v is already present in motor management, for example for the motor control unit, this signal can here be simply ascertained and subsequently evaluated. In step 21, it is verified whether a trailer is fastened to the trailer coupling. This takes place in a subsequent query 24, for example by checking the socket for the trailer. If the on-board network recognizes a user, then a trailer is recognized. Sensors on the ball head of the trailer coupling which emit a signal when a trailer is fastened are also conceivable. Furthermore, in step 22, the tailgate or the rear window are checked, whereby, for example, it is determined by a corresponding sensor unit in the closing range of the tailgate and/or the rear window whether the tail region is closed or open, so that a query 25 subsequent to step 22 examines whether the tailgate and/or the rear window is open.

The yes-outputs of queries 23, 24 and 25 are fed into a logic circuit 26. Here the three signals are AND-connected and the implementation for activating the drive of the trailer coupling takes place in an operating step 27 only when a signal is present at all three inputs. Should one of the conditions 23, 24 or 25 not be fulfilled, then the motion of the trailer-pulling device is blocked or stopped if the condition changes during the motion of the trailer coupling. For this, the no-outputs of the queries 23, 24 and 25 are OR-linked in a logic circuit 28 so that a STOP signal is issued in the event of a change in one condition. In addition, the torque of the drive motor is furthermore recorded during the motion of the trailer coupling in step 30. It is inferred that a hindrance in the swiveling range is disturbing the motion of the trailer coupling when there exists an increased drive torque in operation step 31, so that the motion of the trailer coupling is stopped in step 28 for reasons of safety. Selectively it is also possible in this case to reverse the direction of motion of the trailer coupling after stopping and to move the trailer coupling back by at least a portion of the way.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trailer coupling arrangement for a motor vehicle including a trailer coupling, a coupling ball and a ball neck, said coupling arrangement comprising:
    a drive motor for moving the trailer coupling from an operating a position into a resting position and the reverse;
    a control unit for operating the drive motor wherein the drive motor actuates motion of the trailer coupling only when each of a velocity of the vehicle does not exceed a predetermined value, one of a tailgate and a rear window of the motor vehicle are open, and no trailer is fastened on the trailer coupling; and
    a sensor unit in a closing mechanism of a rear window or tailgate which outputs a signal to said control unit to indicate that the rear window or tailgate is open.

2. The trailer coupling arrangement according to claim 1, wherein conditions for implementation of the motion of the trailer coupling are AND-connected and wherein motion of the trailer coupling is stopped if one of the conditions of the motion of the trailer coupling fails.

3. The trailer coupling arrangement according to claim 1, wherein motion of the trailer coupling is prevented or stopped when torque of the drive motor exceeds a specified reference value.

4. The trailer coupling arrangement according to claim 1, wherein said predetermined value is 5 Km/h.

5. A trailer coupling arrangement for a motor vehicle including a trailer coupling, a coupling ball and a ball neck, said coupling arrangement comprising:
    a drive motor for moving the trailer coupling from an operating a position into a resting position and the reverse;
    a control unit for operating the drive motor wherein the drive motor actuates motion of the trailer coupling only when each of a velocity of the vehicle does not exceed a predetermined value, one of a tailgate and a rear window of the motor vehicle are open, and no trailer is fastened on the trailer coupling; and
    a sensor provided on a coupling head or on an electric socket for connecting the trailer with the motor vehicle for recognizing whether a trailer is mounted on the coupling.

6. A trailer coupling system for motor vehicles comprising:
    a trailer coupling including a coupling ball and a ball neck;
    drive means for moving said trailer coupling from a first position to a second position, and from said second position to said first position;
    a first control means for controlling actuation of said drive means when each of a velocity of said motor vehicle does not exceed a predetermined value, and one of a tailgate and a rear window of the motor vehicle are open and no trailer is fastened on the trailer coupling;
    a second control means for stopping said drive motor when either the velocity of the vehicle exceeds said predetermined value, when the tailgate and the rear window of the motor vehicle are closed or when a trailer is fastened on the trailer coupling.

7. The trailer coupling arrangement according to claim 6, wherein said predetermined value is 5 Km/h.

8. The trailer apparatus according to claim 6, wherein said first control unit is a logic AND gate.

9. The trailer apparatus according to claim 6, wherein said second control unit is a logic OR gate.

10. The trailer arrangement coupling according to claim 6, further including a sensor unit in a closing mechanism of the rear window or tailgate which outputs a signal to said first control unit to indicate that the rear window or tailgate is open.

11. The trailer arrangement coupling according to claim 6, wherein a sensor is provided on a coupling head or on an electric socket for connecting the trailer with the motor vehicle for recognizing whether a trailer is mounted on the coupling.

12. The trailer coupling arrangement according to claim 6, wherein motion of the trailer coupling is prevented or stopped when torque of the drive motor exceeds a specified reference value.

* * * * *